March 18, 1952
E. I. AYERS ET AL
2,589,471
CABLE OUTSIDE INSULATION STRIPPER
Filed Dec. 30, 1950
2 SHEETS—SHEET 2
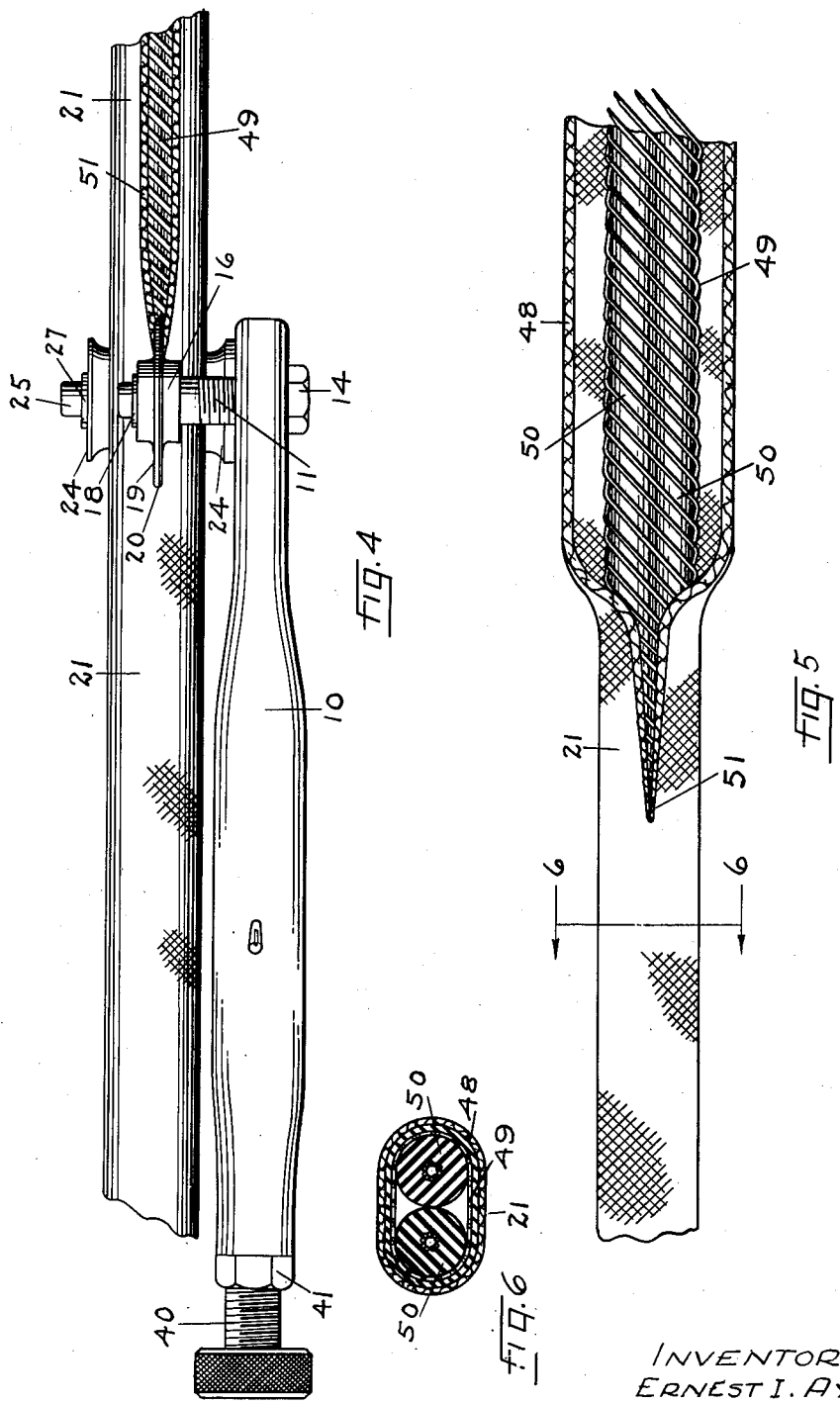
INVENTORS
ERNEST I. AYERS
HARLEY M. AYERS
By Herbert A. Minturn,
ATTORNEY

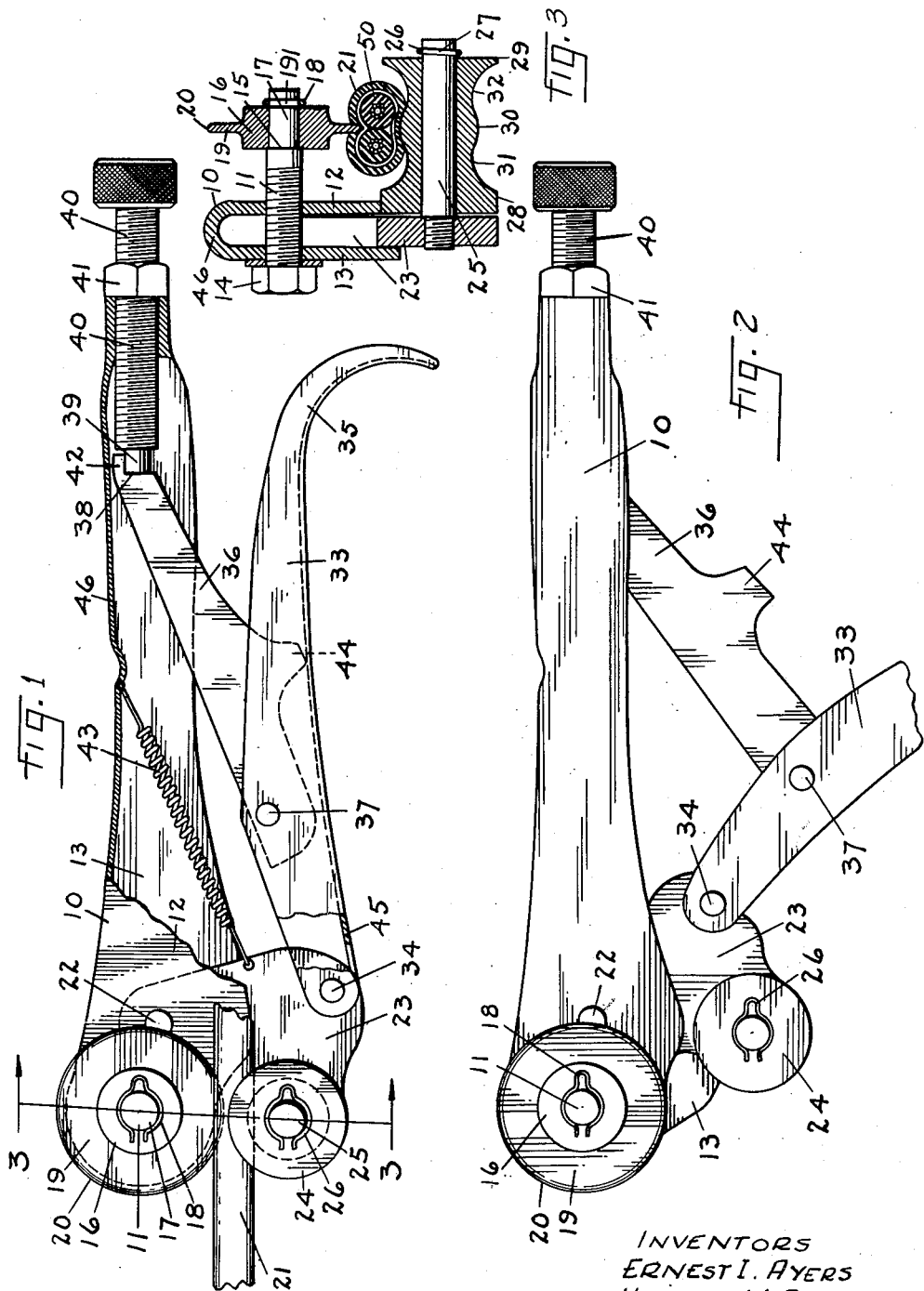

UNITED STATES PATENT OFFICE 2,589,471

CABLE OUTSIDE INSULATION STRIPPER

Ernest I. Ayers and Harley M. Ayers,
Martinsville, Ind.

Application December 30, 1950, Serial No. 203,695

6 Claims. (Cl. 30—91)

This invention relates to a tool for use in slitting the cover insulation on a cable of that type wherein there are at least two conductors, each insulated, one from the other, and the two conductors are surrounded by one or more shields or ground wires which serve as a third conductor, and which lie immediately below the outside insulation.

Such a cable is used in drop service wires from the pole to the house in running a line from the wires on a pole line or the like to the house for electric service. In view of the fact that there is immediately underlying the outside insulating cover, these series of wires constituting the third conductor, it is an exceedingly difficult job to remove the outside insulating cover in order to secure access to these wires and also to the two separately insulated cables. Heretofore this has been done laboriously by the operator using a pocket knife and whittling away on the outside cover, usually to the detriment of the third wires, damaging them or at least reducing their diameter by cutting into them.

It is very necessary that these encircling wires be not damaged to the extent of their diameters being reduced, otherwise the current carrying capacity is lowered.

Therefore it is a primary object of the invention to provide a tool which is to slit the outside insulation down to these encircling wires, without in the least damaging them, and yet which will permit the operator to roll back the slit insulation without any difficulty whatsoever.

It is a further primary object of the invention not only to slit the insulation as indicated, but to do so in one pulling operation so that the time required for that operation is reduced to a minimum.

These and many other objects and advantages of the invention such as the extreme simplicity and relatively low cost of manufacture, of the device, will become apparent to those versed in the art in the following description of one particular form of a device as illustrated in the accompanying drawings, wherein Fig. 1 is a view in side elevation and partial section of a structure embodying the invention;

Fig. 2 is a view of the same structure in side elevation showing the device in an "open" position ready to receive a cable;

Fig. 3 is a view in transverse section on the line 3—3 in Fig. 1;

Fig. 4 is a view in top plan with a section of cable in place and partially slitted;

Fig. 5 is a view of the cable after the outside insulation has been slitted in top plan showing the interior construction; and Fig. 6 is a view in section through the cable on the line 6—6 in Fig. 5.

A body 10 is formed to have a generally U-shaped cross section open from its underside. A pin or stud 11 extends transversely from one side of the body 10, herein shown as from the left-hand side. This pin 11 is screw-threadedly passed through both legs 12 and 13 of the body 10 at the forward end portion thereof, and is fixed in position by means of a nut 14 on the outer end of the stud 11 where it emerges from the leg 13.

On this pin 11 there is provided a shoulder 15 spaced outwardly from the leg 12, so as to form an abutment for a roller 16 which is revolubly carried on the reduced diameter portion 17 extending outwardly from the shoulder 15, of the pin 11. Any suitable means, herein shown as a "hairpin" 18 engaging in a groove 19I around the portion 17 outside of the roller 16 serves to retain the roller 16 in position on the pin 11.

A very important characteristic of the roller 16 is that it have a circular blade section 19 to have an outer peripheral portion 20 which is not sharpened as has been the case heretofore in handling insulation, but is rounded to present a dull edge. We have one particular structure which is very suitable for the purpose wherein the thickness of the blade portion 16 is 3/64 of an inch, and the radius forming the edge 20 is half that thickness. The plane of the plate 16 is spaced outwardly from the leg 12 of the body 10 a distance at least greater than one-half of the major width of the cable 21.

Just back of the pin 11, there is a pin 22 extending between and fixed to the two legs 12 and 13, and on which is rockably mounted a toggle head 23. This head 23 extends downwardly below the under edges of the body sides 12 and 13 to extend a distance sufficiently therebelow to permit mounting on the left-hand face of the head 23 a roller 24.

A stub 25 is fixed to the head 23 to extend from the left-hand side thereof as an axle on which the roller 24 may revolve. In the form herein shown, the stub 25 is screw-threadedly engaged with the head 23 to extend rigidly therefrom. The roller 24 is maintained longitudinally on the stub 25 by any suitable means, herein shown as by means of the "hairpin" 26 engaging in a groove 27 around the outer end portion of the stub 25 outside of the end of the roller 24.

The longitudinal external contour of the roller 24 is very important in the present invention. This shape is best shown in Fig. 3, wherein the roller 24 is provided with outer end flanges 28 and 29 with the periphery of the roller 24 reduced in diameter therebetween. Midway between the inner and outer flanges 28 and 29, the roller 24 is increased in diameter to provide the outwardly rounding portion 30 to leave reduced diameter portions 31 and 32 on either side thereof adjacent the flanges 28 and 29. In other words, the roller 24 has an enlarged "waist line" as compared to the portions on either side of the waist which is designated by the numeral 30. The inner flange 28 clears the under edge of the leg 12 of the body 10.

An operating lever 33 is provided with a U-shaped cross section to have its front end portion straddle the lower and rear portion of the head 23 and be pivotally connected thereto by means of the pin 34. The lever 33 continues rearwardly therefrom to have a finger gripping end portion 35. This lever 33 is positioned by means of its pivot attachment to the head 23 to be in parallelism with the body 10 thereabove.

A bar link 36 has a forward end portion inserted within the lever 33 and is pivotly connected thereto by means of the pin 37 at a distance behind the head 23 and the pin 34. This bar 36 extends upwardly and rearwardly to enter between the legs 12 and 13 of the body 10, and have an end 38 come into abutment with the forward end 39 of an adjusting screw 40.

This screw 40 screw-threads through a rear portion of the body 10 and is fixed in the desired adjustment by means of the lock nut 41. The bar 36 has a finger 42 which fits over the top side of the screw end 39 so that the bar will not normally drop downwardly between the body legs 12 and 13 at that contact. The end 38 of the bar 36 is compressively maintained in contact with the screw end 39 by means of a tension spring 43 which has its forward end fixed to the head 23 and its rear end fixed to the upper portion of the body 10, the spring 43 extending upwardly between the legs 12 and 13 to be substantially confined therebetween. To limit the upper movement of the operating lever 33, so as to fix a distance between the edge 20 of the roller 16 and the waist 30 of the under roller 24, an abutment 44 is provided on the underside of the lever 36 to extend downwardly therefrom to come into contact with the web 45 of the lever 33, Fig. 1. Thus, when the upper side of the finger 42 abuts the web 46 of the body 10, by upwardly travel of the lever 33, the abutment 44 on the bar 36 also will come into contact with the web 45 of the lever 33 and thus stop further movement of the lever 33 toward the body 10. Pulling downwardly on the lever 33, will bring the various shiftable members into the relative positions as indicated in Fig. 2 where the roller 24 is spaced its maximum possible distance from the upper roller 16.

This spacing between the two rollers 16 and 24 in the "wide open" positions as indicated in Fig. 2, permits the cable 21 to be placed therebetween, whereupon the lever 33 is pulled upwardly toward the body 10 to compress the cable 21 between the two rollers. The cable 21 is initially positioned centrally on the roller 24 with its relatively flat side thereagainst, to be centered on the waist 30. The lever 33 is continued to be pulled toward the body 10, which causes the edge 20 of the roller 16 to bite into the outer insulation 48 of the cable 21. Incidentally this insulation 48 may be either of rubber as indicated in Fig. 3, or it may be of a fabric impregnated with some asphaltic or rubberized filler as indicated in Figs. 4-6. In either event, the operation for stripping the insulation remains the same. With the proper setting of the screw 40, the edge 20 is forced into the insulating cover 48 that distance which will cause the edge 20 to pass entirely therethrough, and compress the inner series of wires 49 which extend around the inner pair 50 of conductors down into a V-like formation as indicated in Fig. 3, there being sufficient resiliency or space to permit that formation of the wires 49, all without in any way whatsoever cutting into those wires or reducing their diameters in any respect whatsoever. The cable 21 is held in a fixed manner and the tool set as just described is pulled therealong, to form the slit 51 as indicated in Figs. 4 and 5. The edge 20 as it penetrates the outer insulation 48 maintains the cable 21 centrally over the waist 30 so that the cable is in effect spread downwardly therearound longitudinally of the roller 24 as the cable 21 passes relatively longitudinally thereacross. This means that the upper portion of the cable 21 is placed under considerable tension so that when the edge 20 is brought compressively thereagainst, that rolling operation of the roller 16 causes the edge 20 to penetrate very readily through the cable insulation thus tensioned. Not only is that true, but the groove between the two cables of the pair 50 is centered in respect to the edge 20 of the roller 16 so that that edge 20 always comes therebetween, or rather to enter that groove wherein the wires 49 may be compressed to be out of the way of the penetrating edge 20.

Following the relative travel of the tool along the cable 21, the insulation 48 may be laid open as indicated in Fig. 5 so that it may be cut off transversely of the cable at the end of the cut portion, whereupon the wires 49 may be unwrapped and twisted into the conductor as is the usual practice. Therefore it is to be seen that by the combination of the roller 24 having the enlarged waist 30 and the roller 16 having the relatively thin blade 19 with a rounded penetrating edge 20, the cable to be operated upon is not only maintained in the proper position for the entrance of the edge 20 through the outer insulation without damaging the inter-shielding or surrounding wires, but the entrance of the edge 20 is greatly facilitated by placing the cable initially under tension so as to cause the edges to tend to spring apart as the relatively dull edge 20 is forced therethrough. This combination of the two rollers in the forms described together with any suitable means whereby the rollers may be brought into a relatively fixed space apart spacing for the slitting operation constitutes the gist of the invention.

Therefore, while we have herein shown and described the invention in the one particular embodiment, it is obvious that structural variations may be employed particularly in the means for carrying and spacing apart the rollers, all without departing from the spirit of the invention, and we therefore do not desire to be limited to that precise embodiment beyond the limitations which may be imposed by the following claims.

We claim:

1. A tool for slitting outside insulation from a cable carrying within that insulation an inner separately insulated pair of conductors wrapped around by a third or neutral conductor, comprising a roller having a thin section with a rounded edge as the periphery of the section; a second roller having a central outwardly curving, bulging waist portion; means for mounting the two rollers in relation one to the other whereby the plane of said section includes a diametrical plane centrally through said waist portion.

2. A tool for slitting outside insulation from a cable carrying within that insulation an inner separately insulated pair of conductors wrapped around by a third or neutral conductor, comprising a roller having a thin section with a rounded edge as the periphery of the section; a second roller having a central outwardly curving, bulging waist portion; means for mounting the two rollers in relation one to the other whereby the plane of said section includes a diametrical plane centrally through said waist portion; the longitudinal curvature of said waist being such that pressure of said first roller against a cable resting on said waist will cause said outside insulation to be forced inwardly of the cable between conductors of said pair to apply a tension of the insulation across the line of contact therewith by said first roller.

3. A tool for slitting outside insulation from a cable carrying within that insulation an inner separately insulated pair of conductors wrapped around by a third or neutral conductor, comprising a roller having a thin section with a rounded edge as the periphery of the section; a second roller having a central outwardly curving, bulging waist portion; means for mounting the two rollers in relation one to the other whereby the plane of said section includes a diametrical plane centrally through said waist portion; means for bringing said two rollers relatively one toward the other to limit the penetration of the cable by said first roller edge through said outside insulation and press said third conductor to a limit determined by bending between said pair of conductors.

4. A device for slitting insulation of a cable of at least two conductors comprising means over which the cable may be pressed laterally to carry a portion of the insulation on one side inwardly between said conductors to tension the opposite side; a rounded edged slitting roller in line centrally of said opposite side; and means forcing said slitting roller through said tensioned insulation.

5. A device for slitting insulation of a cable of at least two conductors comprising means over which the cable may be pressed laterally to carry a portion of the insulation on one side inwardly between said conductors to tension the opposite side; a rounded edged slitting roller in line centrally of said opposite side; and means forcing said slitting roller through said tensioned insulation; said first means embodying a surface having a relatively upwardly rounded portion limited to contact said cable insulation over that area lying between said conductors.

6. A device for slitting insulation of a cable of at least two conductors comprising means over which the cable may be pressed laterally to carry a portion of the insulation on one side inwardly between said conductors to tension the opposite side; a rounded edged slitting roller in line centrally of said opposite side; and means forcing said slitting roller through said tensioned insulation; said first means embodying a surface having a relatively upwardly rounded portion limited to contact said cable insulation over that area lying between said conductors; and means limiting the travel of said forcing means to a predetermined degree of roller travel into said insulation.

ERNEST I. AYERS.
HARLEY M. AYERS.

REFERENCES CITED

The following references are of record in the file of this patent:

UNITED STATES PATENTS

| Number | Name | Date |
|---|---|---|
| 554,982 | Claflin | Feb. 18, 1896 |
| 2,502,245 | Charles | Mar. 28, 1950 |
| 2,561,099 | Costelow | July 17, 1951 |